(12) United States Patent
Haimi-Cohen

(10) Patent No.: US 8,806,551 B2
(45) Date of Patent: Aug. 12, 2014

(54) PRIORITIZED RETRANSMISSION OF INTERNET PROTOCOL TELEVISION (IPTV) PACKETS

(75) Inventor: Raziel Haimi-Cohen, Springfield, NJ (US)

(73) Assignee: Alcatel Lucent, Boulogne Billancourt (FR)

(*) Notice: Subject to any disclaimer, the term of this patent is extended or adjusted under 35 U.S.C. 154(b) by 540 days.

(21) Appl. No.: 12/327,400

(22) Filed: Dec. 3, 2008

(65) Prior Publication Data
US 2010/0138885 A1 Jun. 3, 2010

(51) Int. Cl.
*H04N 7/173* (2011.01)
*H04L 1/18* (2006.01)

(52) U.S. Cl.
USPC .......................................... 725/109; 714/748

(58) Field of Classification Search
USPC .......................................... 725/109; 714/748
See application file for complete search history.

(56) References Cited

U.S. PATENT DOCUMENTS

| | | | | |
|---|---|---|---|---|
| 6,292,834 B1 * | 9/2001 | Ravi et al. | | 709/233 |
| 6,570,876 B1 * | 5/2003 | Aimoto | | 370/389 |
| 6,810,488 B2 * | 10/2004 | Teng | | 714/4.1 |
| 6,987,730 B2 * | 1/2006 | Hata et al. | | 370/232 |
| 7,729,240 B1 * | 6/2010 | Crane et al. | | 370/229 |
| 7,808,985 B2 * | 10/2010 | Romero et al. | | 370/389 |
| 2003/0009717 A1 * | 1/2003 | Fukushima et al. | | 714/748 |
| 2003/0058795 A1 * | 3/2003 | Lansing et al. | | 370/235 |
| 2006/0280138 A1 * | 12/2006 | Nanda et al. | | 370/315 |
| 2009/0178087 A1 * | 7/2009 | Menn et al. | | 725/86 |

OTHER PUBLICATIONS

J. Ott, et al., "Extended RTP Profile for Real-Time Transport Control Protocol (RTCP)-Based Feedback (RTP/AVPF)," RFC 4585, Jul. 2006.
J. Rey et al., "RTP Retransmission Payload Format," RFC4588, Jul. 2006.

* cited by examiner

*Primary Examiner* — Benjamin R Bruckart
*Assistant Examiner* — Anthony Bantamoi
(74) *Attorney, Agent, or Firm* — Wall & Tong, LLP

(57) ABSTRACT

A method and system for improved error resiliency in Internet protocol Television (IPTV) are provided. Received media stream is encoded in a real-time protocol. The RTP media stream is then reordered in a homogeneous arrangement (e.g., video packets together, audio packets together) such that each RTP packet, which contains video contains data from a single video frame. Furthermore, each RTP packet contains a RTP header extension, which specifies the priority of the data. Audio frame and intra-coded frames (I-frames) are marked as highest priority frames, predictably coded frames (P-frames) are marked as high priority frames, bidirectionally coded frames (B-frames) are marked as lower priority frames with anything else occupying the lowest priority. The media stream is forwarded to the plurality of users, in accordance with the priority of each packet. A subscriber's device requests retransmission of any missing packets.

13 Claims, 12 Drawing Sheets

BLOCK DIAGRAM OF FCC/RET SYSTEM

REWRAPPER (120)

FLOW CHART FOR HANDLING RET REQUEST

FLOW CHART FOR HANDLING FCC REQUESTS
WITH SKIPPING OF TOO-LATE PACKETS.

TIMING DIAGRAM FOR PACKETS RETRANSMISSION ACCORDING TO STATE OF THE ART METHOD

TIMING DIAGRAM FOR PACKETS RETRANSMISSION ACCORDING TO ONE EMBODIMENT

PRIORITIZED RETRANSMISSION OF INTERNET PROTOCOL TELEVISION (IPTV) PACKETS

FIELD OF THE INVENTION

This invention relates generally to Internet Protocol Television (IPTV) communication and more particularly to prioritized retransmission of IPTV packets.

BACKGROUND

Internet Protocol Television (IPTV) supports multi-media content (e.g., television) delivered via the various technologies used for computer networks. Single program transport streams (SPTS) or multiple program transport streams (MPTS) may be sourced by the same network operator that owns or controls the final mile to the consumer's premises. This control over delivery enables the service provider to guarantee a specific quality of service (QoS) level and offer an enhanced user experience, such as a better on-screen program guide, various interactive services and so on.

For residential users, IPTV is often provided in conjunction with Video on Demand (VOD) services and may be bundled with Internet services such as Web access and voice over IP (VoIP) telephony services. IPTV is typically supplied by a service provider using a closed network infrastructure. For business users, IPTV may be used to deliver multi-media content (e.g., video conferencing) over corporate LANs.

A known issue with IPTV is the loss of packets in a subscriber's loop, which can cause visual and/or audible artifacts in the reproduced video and/or audio at the subscriber's presentation device. When data is missing in the stream, a decoder may respond by skipping the relevant frames which results in a transient freeze of the video or a mute in the audio. Alternatively, the decoder may estimate the missing data using default values, interpolation and similar error concealment methods. Since such estimation is often inaccurate, implementing these methods frequently result in visible or audible impairments.

BRIEF SUMMARY

Various deficiencies of the prior art are addressed by the present system and method for improving error resilience in Internet Protocol Television (IPTV) communication. Specifically, various embodiments provide a retransmission function in a digital television system by classifying packets to provide highest priority (audio frame and video I-frames) and lowest priority packets, wherein a receiver or subscriber's device may request retransmission of a packet, which is pre-classified.

In one embodiment, a computer readable medium for storing instructions which, when executed by a processor, perform a method for improving error resilience in Internet Protocol multimedia communication, comprises: reordering, in response to a request for retransmission, a plurality of packets having associated priority level indicia; and forwarding the packets in order of priority and sequence number toward a device requesting retransmission of the packets.

The method further comprises not sending (discarding) packets whose priority is lower than a predefined threshold (minimum priority).

In another embodiment, a system for improving error resilience in Internet Protocol Television (IPTV) communication, comprising: at least one retransmission (RET) server adapted to contemporaneously receive the multi media stream such that a most recent plurality of the media stream is stored for unicast retransmission at a specified data rate upon request.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1A:
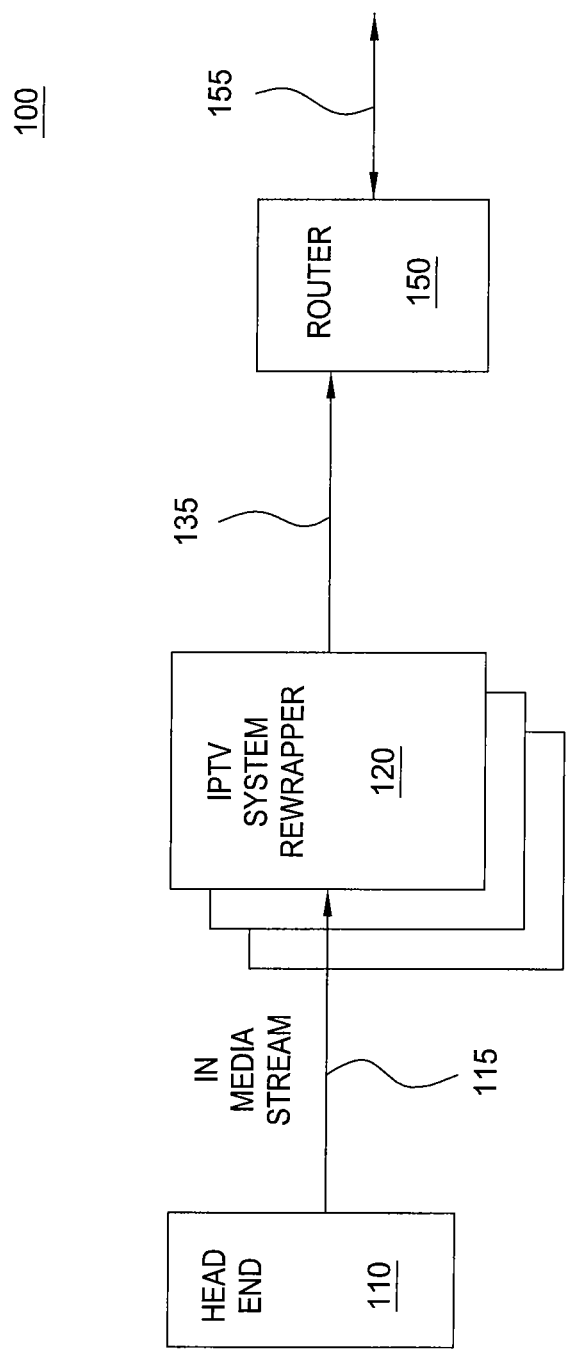
FIGS. 1A and 1B depict a block diagram of an FCC/RET system according to one embodiment.

Although various embodiments are primarily described within the context of an Internet Protocol Television (IPTV) communication system; however, those skilled in the art and informed by the teachings herein will realize that the invention is also applicable to any multi-media communication systems susceptible to presentation artifacts caused by packet loss.

IPTV is used to transport both live TV streams (e.g., multicasting) and stored video streams (e.g., Video on Demand VOD) from servers or head end equipment to client devices or set top boxes. The playback or presentation of IPTV delivered content typically requires either a personal computer or a set top box connected to a TV. Generally speaking, any Internet enabled device such as personal digital assistant (PDA), cellular telephone and the like capable of receiving multi-media transmission may implement the various embodiments described herein. While set top boxes (STBs) are generally discussed within the context of the description, the use of any device having similar functionality is considered to be within the scope of the present embodiments.

Video content is typically compressed using either a video encoder such as an MPEG-2 or H.264 encoder. Audio content is compressed using an audio encoder such as an MPEG-2 Advanced Audio Coding (AAC). The compressed video and audio are typically multiplexed in an MPEG-2 transport stream, which is delivered via IP Multicast in case of live TV, or via IP Unicast in case of Video on Demand. IP Multicast is a method in which information can be sent to multiple devices simultaneously. In standards-based IPTV systems, the following are among the primary underlying protocols used: (1) live TV uses Internet Group Management Protocol (IGMP) for connecting to a multicast stream (TV channel) and for changing from one multicast stream to another (TV channel change); (2) VOD uses the Real Time Streaming Protocol (RTSP). Other protocols may also be used within the context of the various embodiments.

The IP-based platform offers significant advantages over prior architectures, including the ability to integrate television with other IP-based services like high speed Internet access and VoIP. An IP-based platform also allows significant opportunities to make the TV viewing experience more interactive and personalized. Another advantage of an IP-based network is the opportunity for integration and convergence between communications systems and content delivery systems. Because IPTV requires real-time data transmission and uses the Internet Protocol, which is inherently unreliable, packets may be lost or delayed due to noise, interference and limited bandwidth resulting in visible and audible impairments. This problem is most pronounced in the "last mile"—the link between the subscriber's premises and the service provider's equipment and the links within the subscriber's premises (e.g., WIFI links from the residential gateway to the STB). One solution to the loss of packets is to allocate some bandwidth and provide a network device capable of retransmitting the missing packets in response to a request from a subscriber's receiver. An alternative approach is to use forwarded error correction (FEC) rather than retransmission. This approach however, requires allocating additional bandwidth of about 15%, which is used all the time (as opposed to retransmission, which uses its allocated bandwidth only when packets are lost).

An emerging solution is to deploy a retransmission (RET) server, which caches the last few seconds of the channel's data and, upon request, retransmits packets to subscribers according to a defined protocol. However, the bandwidth allocated for retransmission is typically a small fraction of the channel's data rate. Therefore, in the case of a burst loss (a loss of a group of nearby packets) the later packets in the retransmission sequence may arrive at the subscriber terminal too late to be used.

Various embodiments advantageously provide for the substantial elimination of audio artifacts and minimize the occurrence of long duration artifacts. Audio artifacts are much more noticeable and objectionable than video artifacts. Audio information comprises a relatively small fraction of the total bit rate of a multimedia stream.

Due to the recursive nature of video encoding, a lost packet can impact several frames, depending on the position of the lost packet within the video stream. The decoding of a particular frame may depend on previously decoded frames (reference frames). Similarly, those previously decoded frames may themselves depend on other previously decoded frames. Thus, the loss of a video packet impacts not only the frame to which the packet belongs but also all the frames which reference that original frame directly or indirectly. Some video frames are referenced by many frames while other frames are not referenced by any frame. Therefore, the severity of the impairment caused by a packet loss depends on the type of frames having lost packets. For example, in MPEG-2 encoding each group of pictures (GOP) begins with an I (intra-coded) frame, followed by one or more P (predictive coded) and/or B (bi-predictive coded) frames. Each P frame references a prior I or P frame. Each B frame references a prior I or P frame and a subsequent I or P frame. The loss of packets in an I or P frame may cause prediction errors within several frames, causing artifacts that last for a few hundred or even thousands of milliseconds. On the other hand, the loss of B-frame packets only impacts the specific B frame such that a resulting artifact last only as long as the presentation of the impaired frame (e.g., 30-40 milliseconds).

In one embodiment, received media stream is encoded in accordance with real-time protocol (RTP) described in IETF RFC-3550 and RTP/AVT (Audio-Video Transmission) profile described in IETF RFC-3551, which are incorporated herein by reference in their entireties. During this process, the media stream is reordered such that each RTP datagram is homogeneous (e.g., video packets together, audio packets together) and contains the video and audio information for a single frame. This reordering ensures that all the media packets within an RTP datagram have the same relative priority. Furthermore, each RTP packet contains an RTP header extension, which specifies the priority of the data.

Various schemes may be used to determine the priority of a packet or datagram. For example, in one embodiment, datagrams containing packets of audio frame or intra-coded video frames (I-frames) are marked as highest priority frames, datagrams containing packets of predictably coded frames (P-frames) may be marked as high priority frames, datagrams containing packets of bidirectionally coded frames (B-frames) may be marked as lower priority frames with any other datagram being marked with the lowest priority. In other embodiments, another scheme involves setting the priority of a datagram carrying media packets from a particular video frame as the number of other video frames, which references this frame (e.g., in the MPEG-2 video encoder, datagrams carrying B frames would have priority zero and the priority of datagrams carrying a P frame would vary depending on the position of that P frame within the GOP); the priority of a datagram carrying an audio would be set higher than the priority of any video datagram. The loss of high priority datagrams may cause a highly noticeable degradation over a relatively long period of time while the loss of low priority datagrams may have very little impact. During retransmission, the RET server prioritizes the packets according to their importance and send the packets with high priority first. This insures that those packets will arrive at the subscriber on time, thus minimizing the impact of retransmitted packets arriving too late.

Priority level is indicated within a datagram or packet by a priority indicium. Different formats may be used for indicating priority level, including one or more numerical fields, non-numerical information or a combination thereof. A method for determining order among a plurality of priority indicia is predefined. In one embodiment, the priority indicium of a datagram is computed upstream and transmitted downstream in the RTP header extension or in any other way. In other embodiments, the priority is computed at the receiving end by using information contained in the media stream and other available information.

Figure 1B:
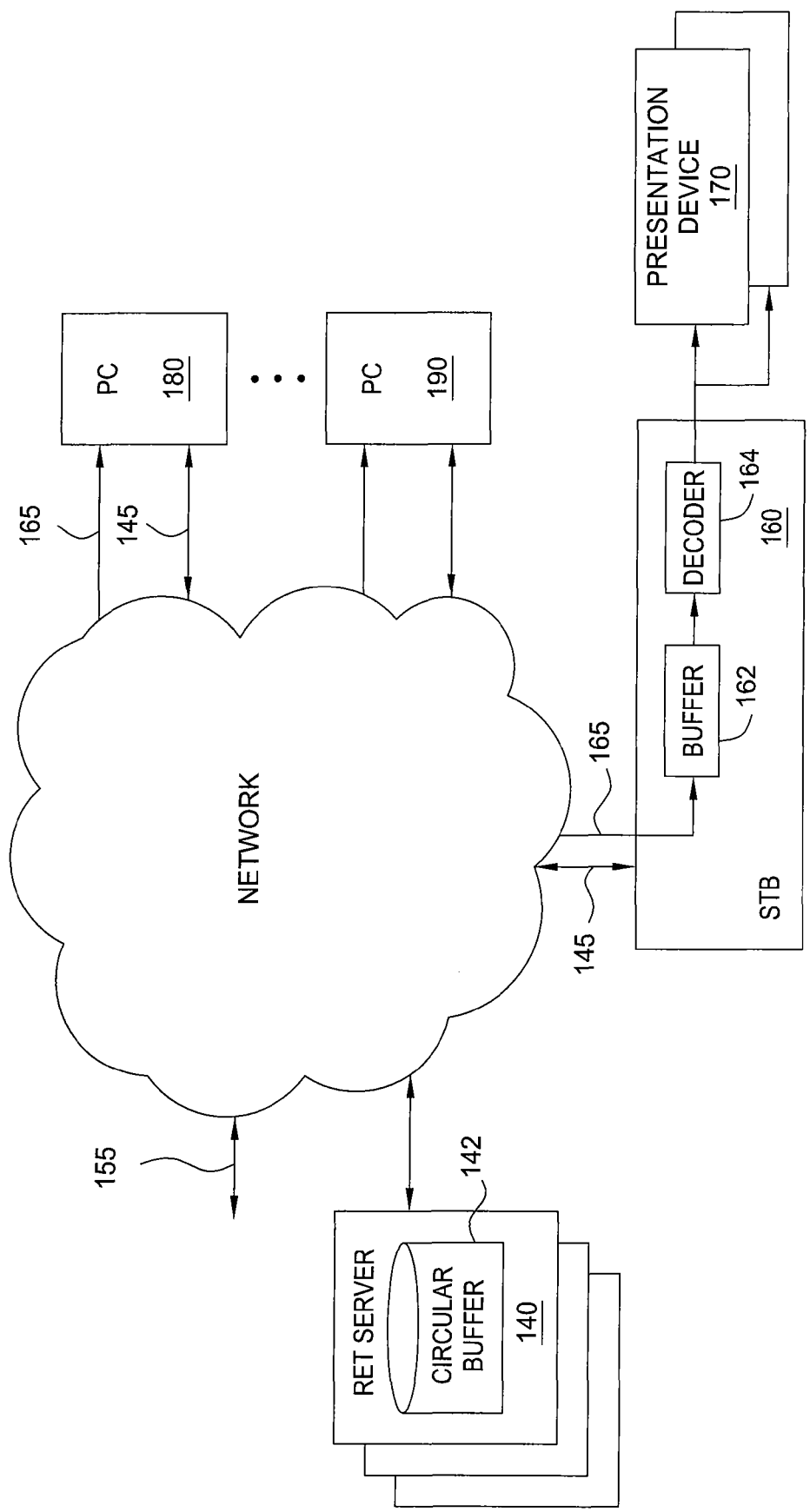

FIGS. 1A and 1B depict a block diagram of an FCC/RET system according to one embodiment. Specifically, FIG. 1A depicts a RET system 100 comprising a Head End 110, one or more rewrappers 120, one or more routers 150, one or more RET servers 140, a plurality of subscriber devices including a set top box (STB) 160 providing audiovisual presentation signals to a presentation device 170 and personal computers (PCs) 180-190. Head End 110 is a source of audio-video material that is streamed to rewrapper 120 via communications link 115. Head End 110 may be a Television distribution facility, a cable system Head End, a broadcast distribution facility or a satellite television distribution facility. Link 115 may be a cable or fiber optic link, a combination of such links or any other suitable communications path. Rewrapper 120 processes the stream and forwards the processed stream to router 150 via communication path 135. The architecture allows for multiple rewrappers to accommodate multiple channels, fail-over redundancy or future expansion. In one embodiment, if the RTP datagram is already generated at the Head End, then the rewrapper is bypassed.

Router 150 forwards the stream to subscribers via communication path 155. RET server 140 also receives the stream.

Generally, each central office (CO) of a service provider is equipped with at least one RET server and, optionally, a backup RET server. Where the number of channels serving a particular area is larger than the capacity of a RET server, then multiple servers would be required. Other RET servers may be placed in other places in the network, e.g., to serve mobile subscribers who are not associated with a particular CO.

Figure 6:
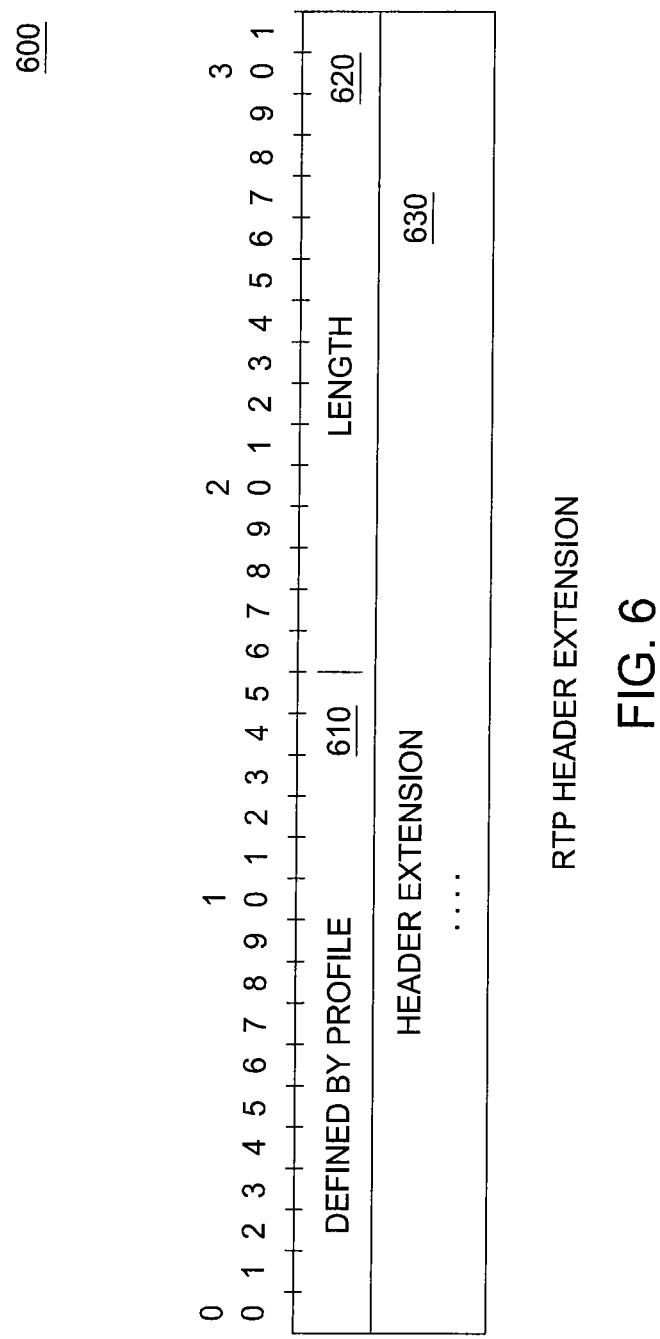
FIG. 6 graphically depicts RTP Header Extension according to one embodiment.

In one embodiment, the audio-video output of a rewrapper is packed as an MPEG-2 Transport Stream (TS). It will be understood by an artisan of ordinary skill in the art that the audio-video material may be encapsulated according to any other standard. The MPEG-2 transport stream (TS) format is a "container" format which comprises several synchronized elementary streams. An elementary stream (or a media class) is a stream of content which can be decoded individually, e.g. audio, video, subtitles etc. The Transport Stream consists of TS packets. Each TS packet carries either content from a particular elementary stream or tables which describe the structure and content of the TS itself. Most of the TS packets belong to the first type, i.e. they carry elementary streams material. Each RTP datagram, which contains video, contains data from a single video frame. Furthermore, each RTP datagram contains an RTP header extension 630 as depicted in FIG. 6.

Figure 5:
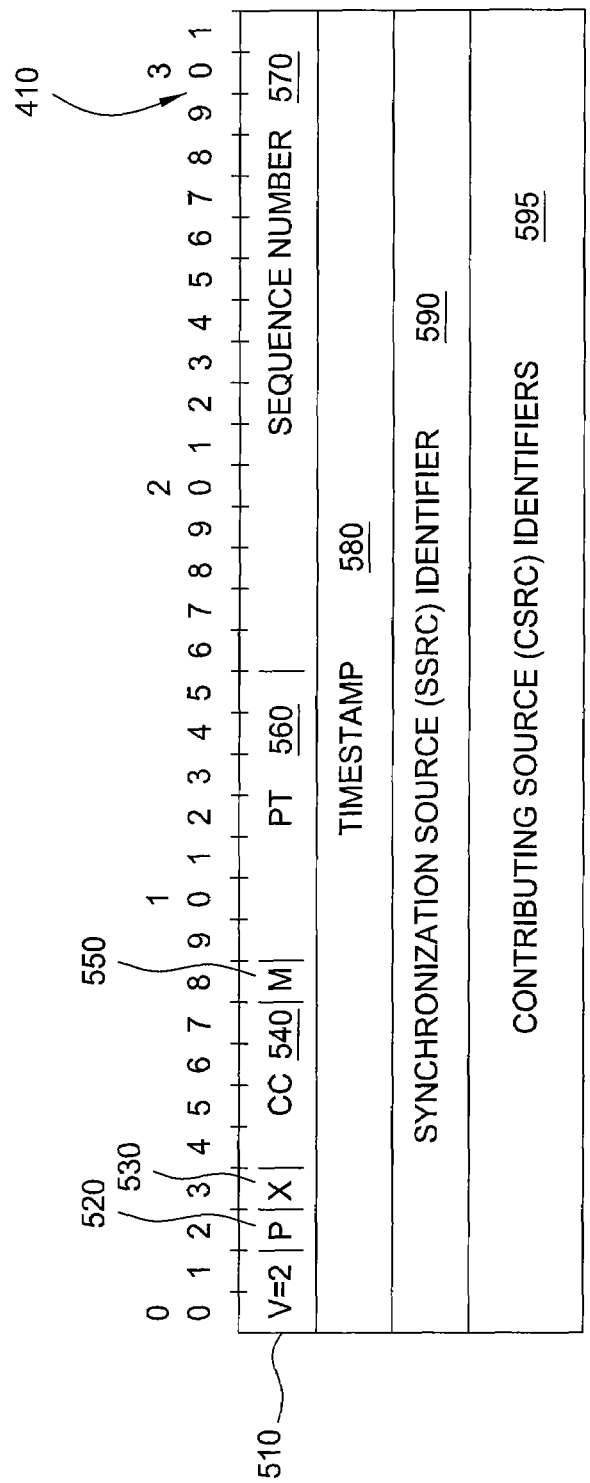
FIG. 5 graphically depicts RTP Fixed Header Fields according to one embodiment.

FIG. 5 graphically depicts RTP fixed Header Fields according to one embodiment. Referring to FIG. 5, if 'X' bit 530 in the RTP header is one, a variable-length header extension must be appended to the RTP header, following CSRC 595 list. The header extension contains a 16-bit length field 620 that counts the number of 32-bit words in the extension, excluding the four-octet extension header (therefore zero is a valid length). Header extension 610 may specify the priority of the data as follows: highest priority: audio frames and video I-frames; higher priority: video P-frames; lower priority: video B-frames; lowest priority: anything else.

In other embodiments, a different protocol is used to provide information about the packet including the priority of the packets.

Referring to FIG. 1B, RET server 140 is a network device which also joins the multicast group of the RTP stream of the channel. The RET server stores the RTP datagram which it receives in its circular buffer 142. Thus, at any given time the RET server has the recent history of the channel content in the circular buffer. When the RET server receives an RET request, it finds the datagrams with the requested sequence numbers in the circular buffer and sends them to the STB via communication path 145 in order of priority. In one embodiment, the RET packets are sent according to the format specified in IETF RFC-4588, which is incorporated herein by reference in its entirety. In other embodiments, other formats are used. Furthermore, the RET server may determine the priority of the datagrams by analyzing their content if such were not performed by the rewrapper. Generally, the bandwidth available for sending RET datagrams is limited and significantly lower than the channel data rate, so the RET server paces the transmission of RET datagrams to the STB in order to satisfy the timing constraint shown in FIG. 10. The STB receives the RET packets from the RET server and places them in its buffer (162) according to their sequence number.

Figure 9:
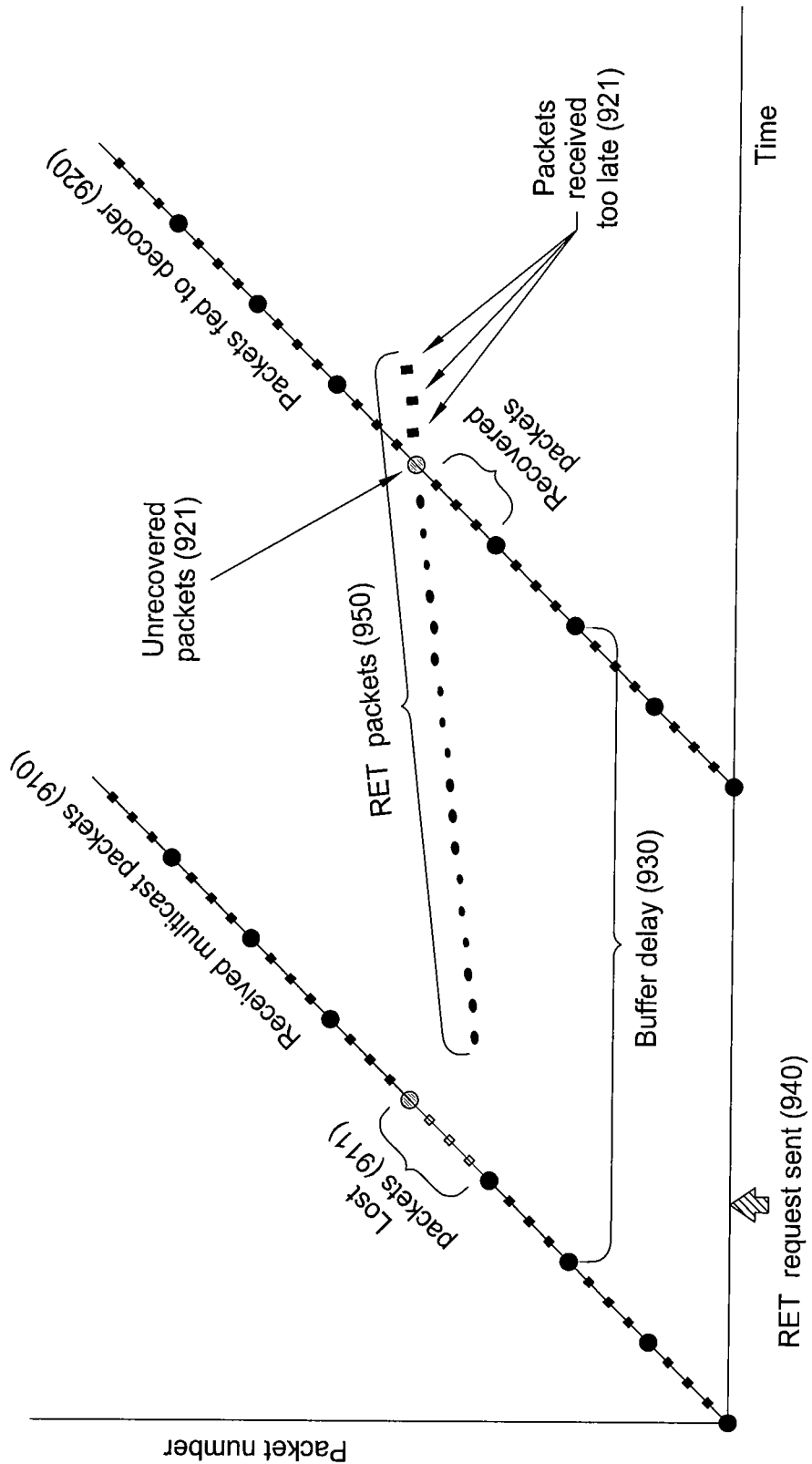
FIGS. 9 and 10 graphically depict Timing Diagram for Packets Retransmission according to one embodiment.

FIG. 9 graphically depicts Timing Diagram for Packets Retransmission according to one embodiment. Specifically, FIG. 9 graphically depicts a timing diagram in which a first curve 910 represents a typical packet transmission received at a STB. Priority is indicated by different symbols. Three priority levels are depicted: high, medium and low (corresponding to I, P and B frames, respectively). In this illustrative diagram, each segment of a given thickness represents three datagrams of the respective priority. Lost datagrams 911 are shown in gray. A second curve 920 represents the time at which the received datagrams are fed to the decoder (164 in FIG. 1B). Unrecovered datagrams 921 are shown in gray as they are feed to the decoder. Buffer delay 930 is the delay introduced by the buffer in the STB (162 in FIG. 1B). The RET datagrams 950 are sent at a rate which is much slower than the data rate (lower slope) and, as a result, some of the RET datagrams (951) arrive too late. Those unrecovered datagrams are of high priority, hence their loss may cause significant impairment.

Figure 10:
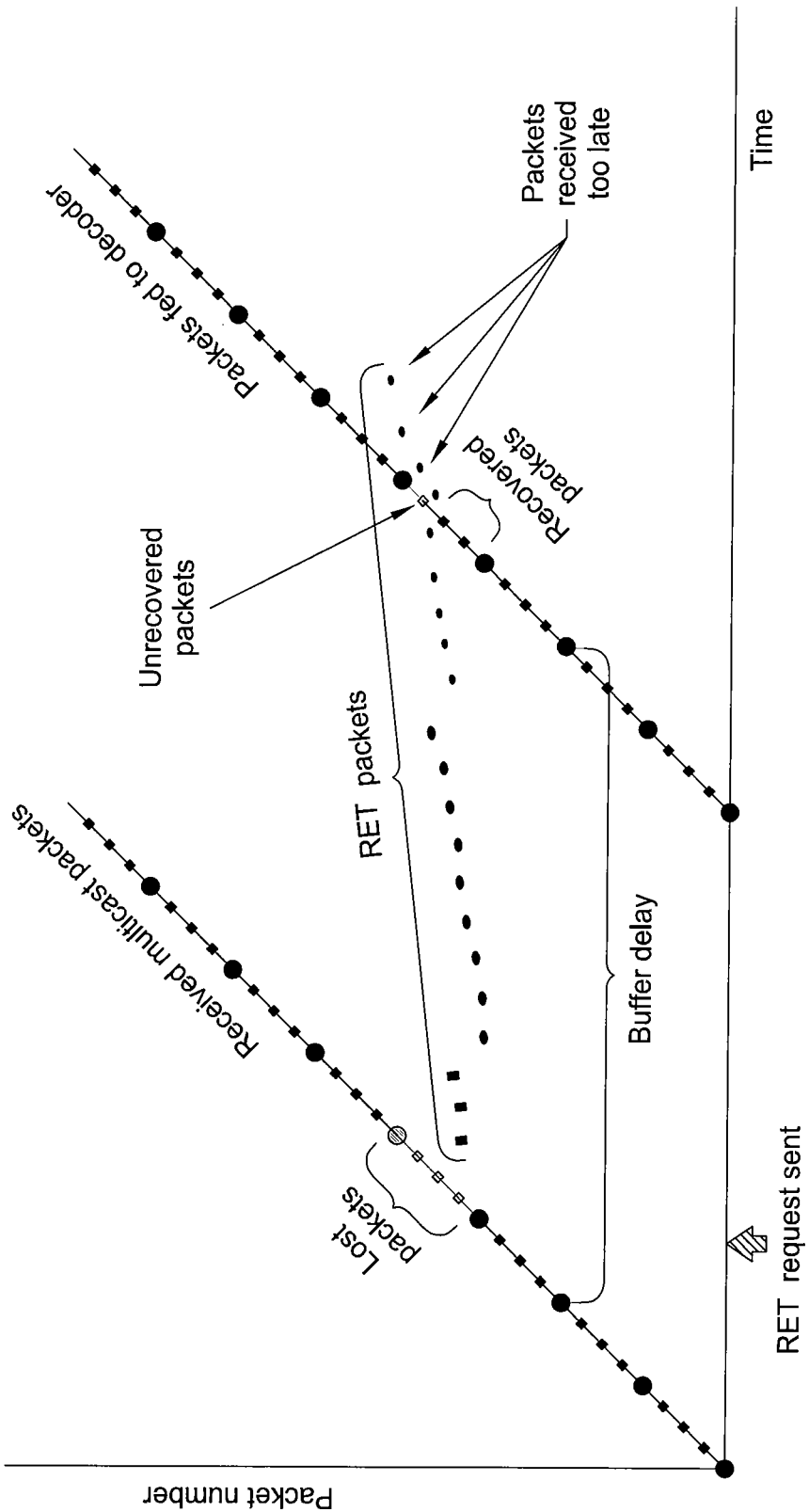

FIG. 10 shows a Timing Diagram for Packets Retransmission according to one embodiment. In this instance, the packets are sent by priority order (i.e, the high priority packets are sent first, then the next priority packets are sent and finally the lower priority packets are sent last). As shown, the unrecovered packets are the lowest priority packets. More or fewer than three priority levels may be defined within the context of the present embodiments.

It is possible that some of the RET packets will get lost too, or that the RET request message is lost and never reaches the RET server. Therefore, in one embodiment if after a certain period of time the STB does not receive some of the requested packet it can request them again, even several times. However, an RET packet can be fed to the decoder only if it arrives before its scheduled time. If the packet arrives later, it cannot be used and is discarded. RET packets may arrive too late at the STB for various reasons, including: (1) repeated loss of RET requests or RET datagrams; and (2) a "burst" loss resulting in a request for retransmission of a large number of packets. Since the RET packets are sent at a rate which is much lower than real time, the delay of each subsequent RET packet with respect to the multicast increases, until at some point it may exceed the delay provided by the STB buffer. However, as explained below there are ways to combat this phenomenon.

Rewrapper 120 is described with reference to FIG. 2 below. The rewrapper streams the signal to the subscribers. The process of streaming the signal to the subscribers may be effected using various different media and transport mechanisms as explained herein.

Figure 2:
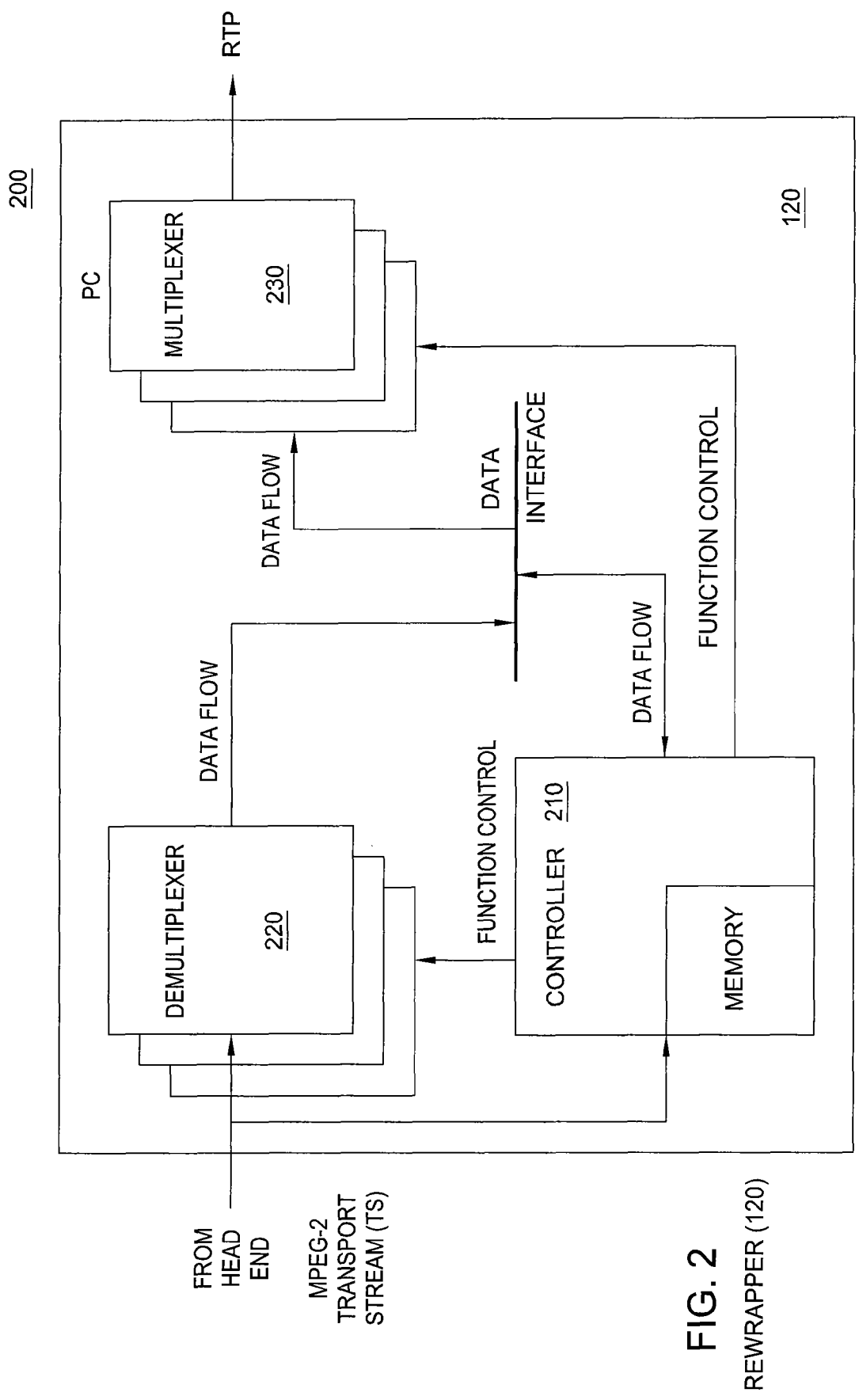
FIG. 2 graphically depicts a Block Diagram of the Rewrapper according to one embodiment.

FIG. 2 graphically depicts a Block Diagram of the Rewrapper according to one embodiment. Referring to FIG. 2, rewrapper 120 is a server grade computer or any device capable of processing the signal flow. As the transport stream is received, controller 210 selects demultiplexer 220 so that the stream is demultiplexed to its elementary stream components. When the rewrapping process is completed, controller 210 selects multiplexer 230 and the stream is multiplexed again. The architecture allows for multiple multiplexers and demultiplexers to accommodate multiple channels or future expansion.

The rewrapper then forwards the signal to router 150. The rewrapper sends out the re-multiplexed TS as a Real Time Protocol (RTP) stream. The RTP streaming protocol is defined in IETF RFC-3550, the entire content of which is incorporated herein by reference. Each RTP datagram consists of a standard header 410 and payload 430 as depicted in FIGS. 5 and 6. In other embodiments, a different protocol is used to provide information about the packet including the priority of the packets.

In one embodiment, the payload is several whole TS packets as specified by IETF RFC-3551. The RTP header contains a sequence number 570, thus the recipient of an RTP stream can detect missing datagrams by noticing gaps in the sequence of received RTP stream. The RTP header also contains a time stamp 580 derived from the timestamps embedded in the TS. The difference in the time stamps between two RTP packets is approximately the difference between the times at which each of those packets needs to be fed to the decoder. The rewrapper packs TS packets in RTP datagrams so that all the TS packets packed in the same RTP datagram are of the same priority and belong to the same elementary stream or class. The rewrapper writes the priority of the TS packets of each RTP datagram in a field in the RTP header (more specifically, in the header extension). The other fields of the header include: version (V) 510, a 2-bit field which identifies the version of the RTP; padding (P) 520, a 1-bit field if set, the packet contains one or more additional padding octets at the end which are not part of the payload; extension (X) 530 a 1-bit field if set, the fixed header follows by exactly one header extension; CSRC count (CC) 540 a 4-bit field contains the number of CSRC identifiers that follow the fixed header; marker (M) 550 a 1-bit field; payload (PT) 560 a 7-bit field identifies the format of the RTP payload; SSRC 590 and CSRC 595. The priority determination can be enhanced by incorporating additional information such as user preferences (e.g., language) or technical parameters (e.g., available bandwidth for RET) in the determination of the final priority indicia (e.g., lowering priority of streams which the user has no interest in). This method may result in discarding some packets because they are of no interest to the user. User preferences and user-specific technical parameters can be obtained from many sources, e.g., look-up in a database. If that information is included in the RET request itself, the information would be dynamic and current.

When a set top box (STB) 160 is tuned to a digital IPTV channel, the STB joins the multicast group of the channel and begins to receive the RTP datagram stream of this channel. The received datagrams are saved to a memory buffer and after some delay, their content is fed to the decoder which decodes it. Then the decoded material is sent to the appropriate presentation devices 170 (screen, speakers, etc.). The STB checks for missing RTP datagram in the content of the buffer. It does so by looking for discontinuities in the sequence numbers of the RTP packets in the buffer. If it detects missing RTP datagrams, it sends a retransmission (RET) request to the RET server with the list of the missing packets. In one embodiment, the requests are sent in the format specified by IETF RFC-4585, the entire content of which is incorporated herein by reference. In other embodiments, other formats are used.

Figure 7:
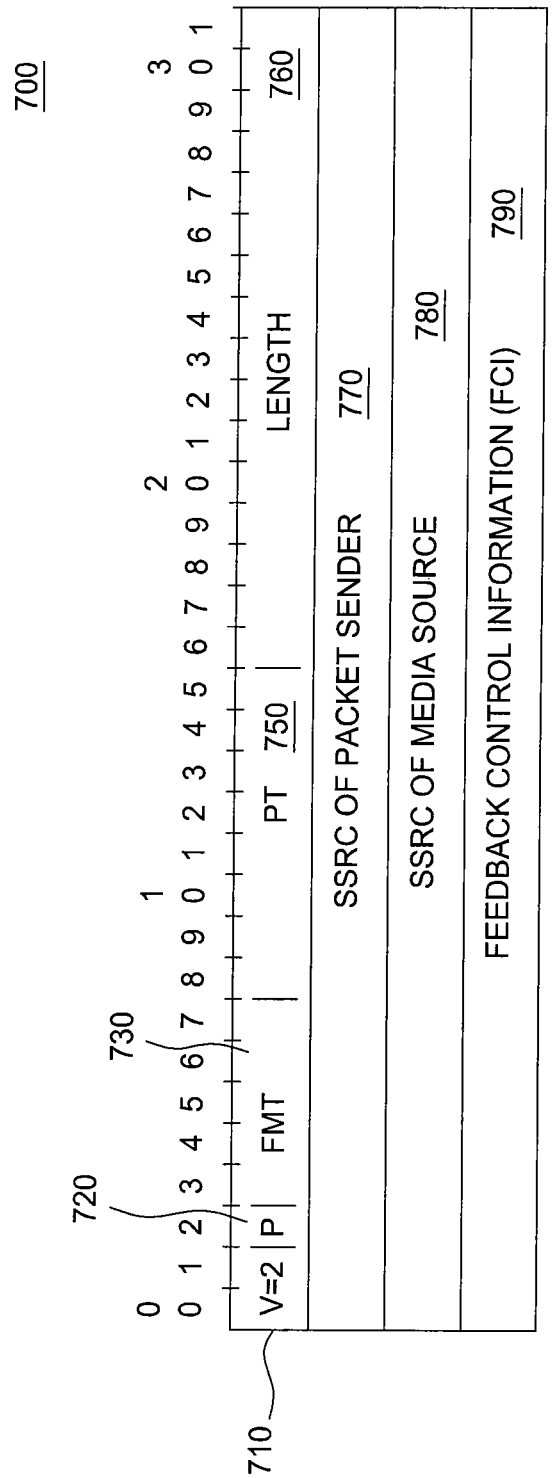
FIG. 7 graphically depicts a Common Packet Format for Feedback Messages according to one embodiment.

FIG. 7 graphically depicts a Common Packet Format for Feedback Messages according to one embodiment. Specifically, FIG. 7 shows the common packet format for feedback messages. The fields are similar to those depicted in FIG. 5 and outlined in detail above. However, feedback control information (FCI) field 790 needs to be highlighted at this juncture. It is a variable length field, which must contain at least one Generic NACK. The Generic NACK shown in FIG. 8 is used to indicate the loss of one or more RTP packets.

Figure 8:
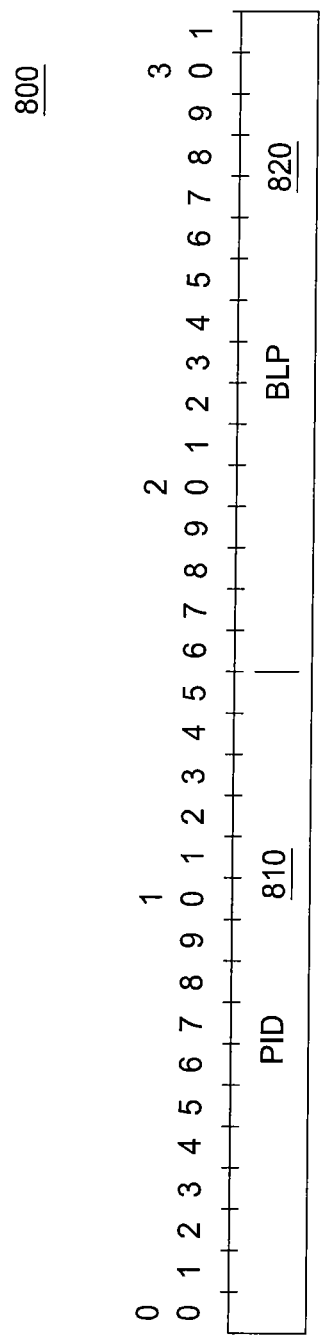
FIG. 8 graphically depicts the Syntax for a Generic NACK Message according to one embodiment.

FIG. 8 graphically depicts the Syntax for a Generic NACK Message according to one embodiment. Referring to FIG. 8, packet ID (PID) 810 is used to specify a lost packet. The PID field refers to the RTP sequence number of the lost packet; bitmask of following lost packets (BLP) 820 allows for reporting losses of any of the 16 RTP packets immediately following the RTP packet indicated in the PID. It is worth noting that in other embodiments a different protocol is used for feedback messages.

An STB may not be using all the elementary streams in a TS, e.g., the TS may contain several audio elementary streams in several languages, and only one of them is actually being decoded and played. The STB may indicate in the RET request which elementary streams are necessary, and the RET server will skip packets of other elementary stream (effectively changing their priority to be less than $P_{Min}$ which is the minimum allowed priority). The STB is configured with the IP address for the RET server to which a request is sent. In one embodiment, the STB is configured with the IP address of a primary RET server and a secondary RET server. In other embodiments, other configurations are used.

Figure 3A:
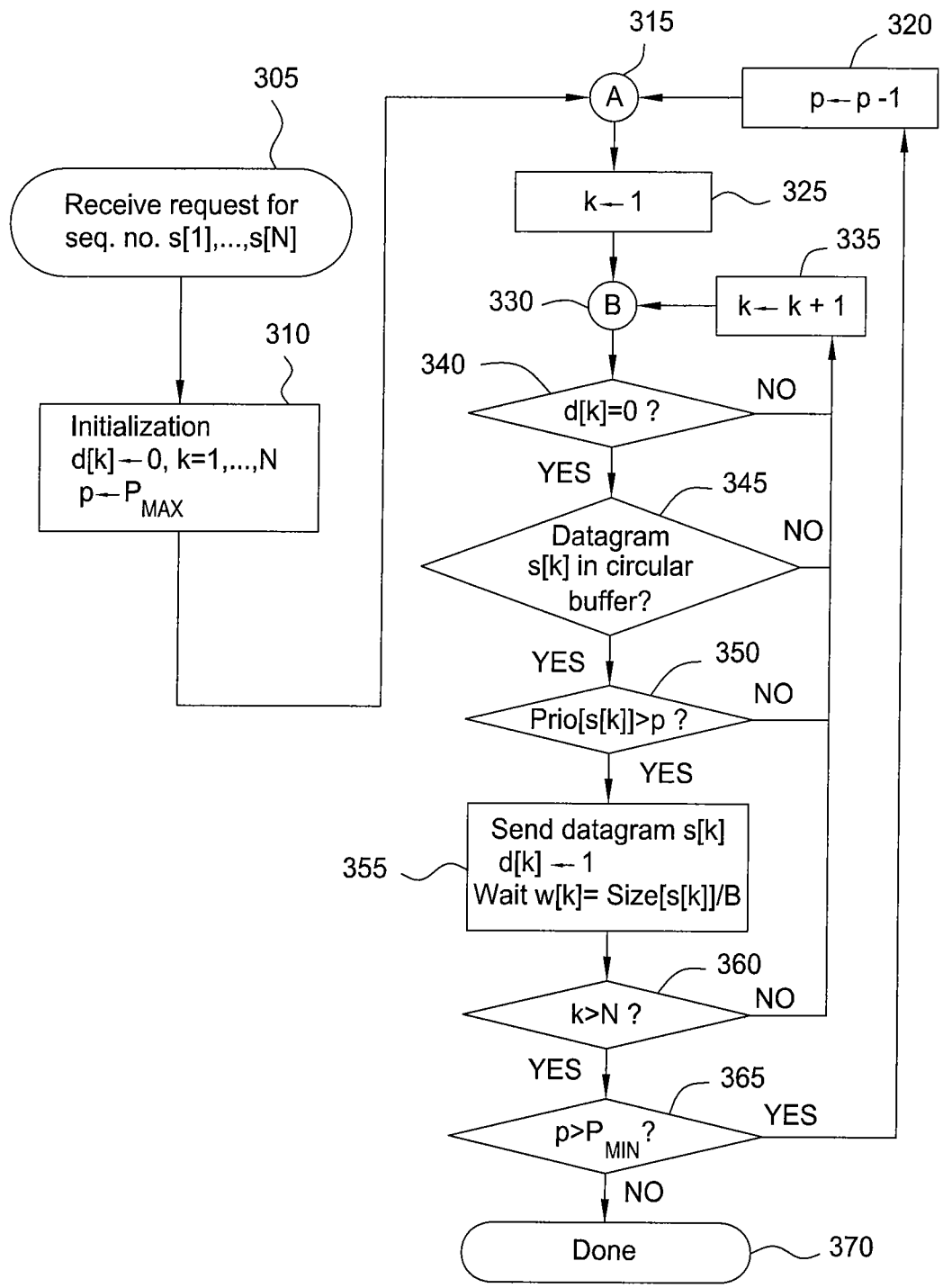
FIGS. 3A and 3B depict flow diagrams of a method for processing RET and FCC requests according to one embodiment.
Figure 3B:
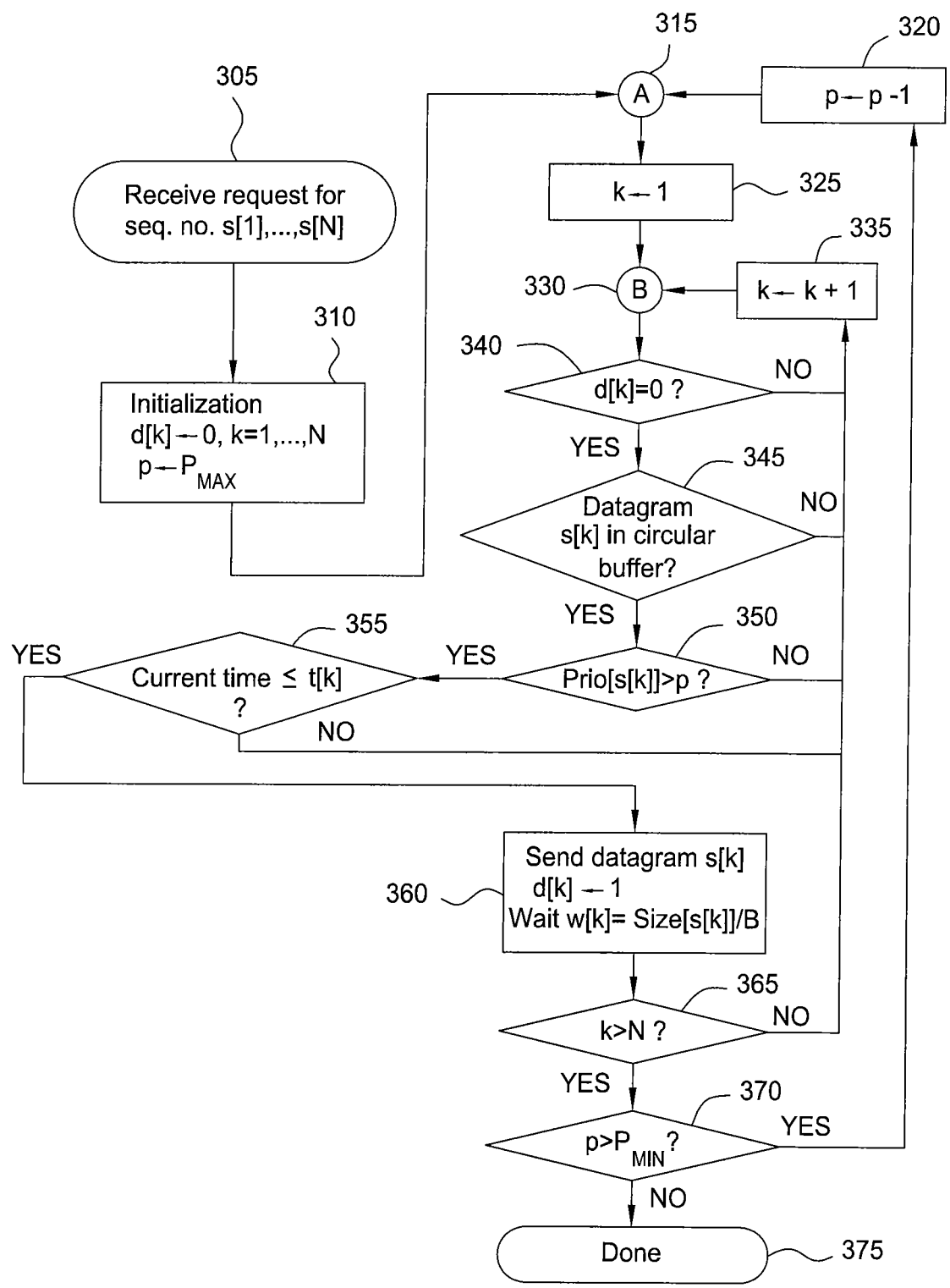
Figure 4:
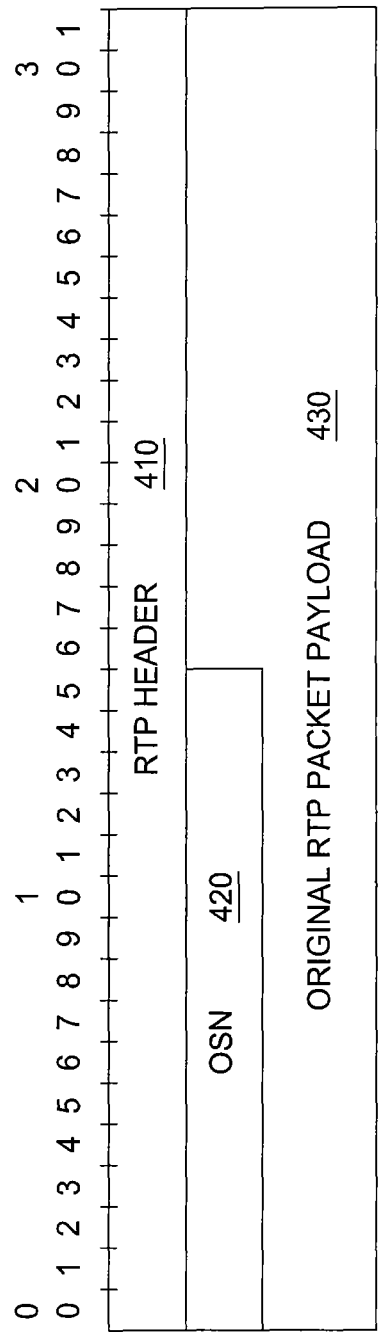
FIG. 4 graphically depicts a retransmission packet format according to one embodiment.

FIGS. 3A and 3B depict flow diagrams of a method for processing RET and FCC requests according to one embodiment. Specifically, FIG. 3A is a flow diagram of a method suitable for use in a RET server for processing a request for retransmission of N packets. The method 300 is entered at step 305, where a request for sequence numbers s[1], . . . , s[N] is received. When the server receives a request for retransmission, the server does not send the packets to the client in the same sequence number order. Rather, the server reorders the list of packet to be sent according to, illustratively, two criteria: first, the packets are grouped by priority and higher priority groups are placed first; second, within each priority group the packets are sorted in increasing order of sequence number. In step 310, an array of flags d[1], . . . , d[N], is initialized to zero indicating that no packet has been sent yet; and priority threshold (p) is initialized to the value $P_{Max}$ which is the highest value a datagram can assume.

Retransmission is performed in two steps or loops: an outer loop encompassing the priorities and an inner loop encompassing the requested packets. Iterations for the outer loop begins at A (315) and ends at 320 where the current priority threshold p is decremented by 1. The outer loop ends when the loop variable p reaches $P_{Min}$ 365 at which point the retransmission transaction is done. In each iteration of the outer loop, packets of priority higher than p are sent. At the start of each iteration of the outer loop, the inner loop index k is initialized to 1 (325).

Iterations of the inner loop begins at B (330) and ends at 335 where the loop index k is incremented by 1. The inner loop ends when loop index k has iterated over all the sequence numbers 360. If $P_{Min}$ is set higher than the minimal priority found in the stream, some low priority datagrams may not be retransmitted at all. This may be useful in order to reduce the volume of the RET server if it is overloaded. In each iteration of the inner loop, transmission of the datagram corresponding to s[k] is evaluated. The datagram is transmitted in the inner loop if all three conditions are satisfied:
1. The datagram has not been transmitted in a previous loop (d[k]=0), step 340 checks for the value (d[k]=0).
2. The datagram is present in the circular buffer, step 345 checks if the datagram s[k] is in the circular buffer.
3. The datagram's priority Prio[s[k]] is not lower than the loop priority p, step 350 checks if the variable Prio[s[k]] is greater than or equal to loop priority p.

If a datagram is transmitted in step 355, it is marked as such by setting d[k] to 1. The packets are transmitted to the client at the specified data rate in the new order. After transmitting the datagram, the server waits in order to satisfy the bandwidth requirement. If the allowed bandwidth for RET is B and the size of the datagram is Size[s[k]], then the waiting time w[k] is Size[s[k]]/B.

The server may receive a new request for retransmission (from the same device) while it is still sending the packets from a previous request. This can be either because the device detected a new gap in the incoming multicast sequence, or because the device assumed that some of the retransmission packets have been lost and hence request the same packets again. In one embodiment, when a new retransmission request is received while the previous one is being served, the server combines the requested packets in the new list with the unsent packets of the old list, removes duplications and reorders the combined list according to the criteria outlined above.

To illustrate the timing and bandwidth issues mentioned above, it is assumed that the RET server receives at time treq a request for retransmission of N datagrams with serial numbers s[1], ..., s[N]. For simplicity, it is further assumed that all the requested datagrams are available in the circular buffer of the RET server. Let u[1], ... u[N] be the corresponding time stamps of the requested datagrams. Let uout be the time stamp of the packet, which the STB was feeding into its decoder at the time in which the retransmission request was sent. Then the datagram with sequence number s[k] must arrive at the STB no later than u[k]−uout after the request was sent, or else it will be unusable having arrived too late. Thus, the time datagram s[k] may be sent the latest and still be useful is expressed by Equation (1):

$$t[k]=t_{req}+u[k]-u_{out}-T_{RT} \quad (Eq. 1)$$

where $t_{req}$ is the time the RET server receives a request for retransmission; $u[k]-u_{out}$ is the latest the datagram with sequence number s[k] must arrive at the STB after the request was sent; $T_{RT}$ be the round trip travel time from the STB to the RET server and back.

The mechanisms by which the RET server estimates t[k] and how the retransmission process may be improved having these estimates is now examined. Considering Eq. (1), treq and u[k] are known to the RET server. The round trip time, TRT, can be found using various well known methods, and in many cases it is small enough to be neglected; uout is known at the STB when the retransmission request is sent. It can be incorporated in the RET request and thus be available to the server. Alternatively, a fixed delay D at the STB from the arrival of a multicast packet until it is fed to the decoder is assumed and it is further assumed that each multicast packet arrives at the RET server and at the STB at approximately the same time. Let vreq be the time stamp of the multicast datagram which arrives at the RET server at about the same time as the retransmission request, that is approximately at time treq. Then, if above assumption uout=vreq−D is established and Eq. (1) becomes:

$$t[k]=t_{req}+u[k]-(v_{req}-D)-T_{RT} \quad (Eq. 2)$$

Thus, the RET server can estimate t[k], which is the latest datagram s[k] can be sent. Referring to FIG. 3B, t[k] is compared to the current time at 355, if a datagram is supposed to be sent but it is too late to deliver it in time, the packet is skipped and wait w[k] 360 is not executed, rather step 365 is executed. This means that subsequent datagrams will be sent earlier, thus having a better chance of arriving in time, and if some RET datagrams are lost, that would provide more time for a second retransmission attempt. Retransmitting packets in order of priority may result in more packets being skipped because their scheduled time is too late. In one embodiment, an order of sending is adopted which achieves both goals: have as many packets as possible sent in time to be usable and sending higher priority packets first. For illustrative purposes, a method to achieve this goal is explored. Let k[j], j=1, ..., N be a particular ordering of the N requested sequence numbers. For this particular ordering, the datagram with sequence number s[k[1]] is sent at time g(1)=treq and the datagrams with sequence number s[k[ ]], where j>1 are sent at time g(j) given by the expressions:

$$g(j)=g(j-1)+w[k[j-1]] \text{ if } g(j-1)\leq t[k[j]] \quad (Eq. 3)$$

$$g(j)=g(j-1) \quad (Eq. 4)$$

Eq. (3) represents the case where the datagram with sequence number s[k[j−1]] is in time and should be sent. Eq. (4) represents the case where the datagram with sequence number s[k[j−1]] is too late and is skipped. Let k'[j]], j=1, ..., N be another ordering of the N requested sequence numbers, which is obtained from k[j]], j=1, ..., N by swapping between two datagrams, k[a] and k[b] (a<b): k'[a]=k[b], k'[b]=k[a] and keeping all other datagrams in the same order. A criterion for determining if the ordering k'[j] is "better" than the ordering k[ ] is defined, for example: the ordering k'[j] is "better" than the ordering k[ ] if Prio[k'[a]]>Prio[k'[b]] and for each priority level, if the number of datagrams which are too late in the ordering k'[j] does not exceed the number of datagrams which are too late in the ordering k[j]. Starting with some default ordering, e.g., k[j]=j and then repeatedly finding a pair of indices, a<b such that swapping k[a] and k[b] results in a "better" ordering. Once such a pair is found, the indices are swapped and again a search is undertaken for a pair of indices which can result in "better" ordering and again they are swapped. This process is continued until there are no more pairs of indices which can be swapped to yield a "better" ordering. Then the process stops and the final ordering is the order in which packets are to be sent. Note that the transmission order of FIG. 3B is obtained from the same method using a different criterion which does not take the number of "too late packets" into account:

The ordering k'[j] is "better" than the ordering k[ ] if Prio[k'[a]]>Prio[k'[b]].

Eq. (3) shows that the time of sending of datagrams, and the decision whether the datagram is to be sent or not, depends on waiting times w[1], ..., w[N], which in turn depend on the allowed bandwidth B. Typically B varies from STB to STB and it varies over time as well. If B is configured in the RET server as a worst case low value, then there may be many cases in which RET datagrams are sent at a rate lower than actually necessary and as a result more packets are skipped, or are sent too late. It is possible to have the STB add its allowed RET bandwidth to the RET request, so that the RET server will use the correct value. However, in many cases the STB does not know the actual allowed bandwidth because, for example, there may be other STBs sharing the same access loop. However, in many IPTV configurations this information about the allowed bandwidth is at the digital subscriber line access multiplexer (DSLAM) and all RET requests go through the DSLAM. So the DSLAM or another network element may intercept the RET request messages and write into them the correct value of allowed bandwidth.

Thus, various embodiments comprise a system and method providing improved error resiliency wherein the priority level for packets included within a video-bearing media stream are identified to provide thereby a priority order of packets, and each packet header is modified to contain a header extension, which specifies the priority indicium of the data. For example, in one embodiment, if the video data is sent as RTP datagrams from the Head End, then the rewrapper is unnecessary. In this case, the determination of the priority of each datagram needs to be done at the RET Server. Each datagram may contain TS packets of different priorities, so the priority of the datagram may be set, for example to be the highest among the priorities of the TS packets which it comprises. TS packets with priority less than $P_{Min}$ may be removed from the RET packet before sending the packet to the subscriber.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for improving error resilience in Internet Protocol multimedia communication, comprising:
    receiving a multimedia stream at a retransmission (RET) server configured to store for retransmission a plurality of packets forming a most recent portion of the multimedia stream; and
    forwarding, toward a device associated with a retransmission request, only retransmission packets able to be timely processed by said device as indicated by a time stamp included within said retransmission request of a packet being processed by said device;
    wherein a time that a packet[k] may be forwarded to said device is expressed by the equation:

$$t[k]=t_{req}+u[k]-u_{out}-T_{RT}$$

where:
    $t_{req}$ is the time the RET server receives a request for retransmission;
    $u[k]-u_{out}$ is the latest a packet with a sequence number s[k] must arrive at the device after device transmission of the request;
    $T_{RT}$ is a round trip packet travel time between the device and RET server.

2. The method of claim 1, wherein retransmission packets able to be timely processed by said device are associated with priority level indicia and forwarded in a priority order.

3. The method of claim 2, further comprising reordering the packets forming the most recent portion of the multimedia according to respective packet sequence numbers and said priority level indicia.

4. The method of claim 3, further comprising sorting packets according to said packet sequence numbers within each of a plurality of priority groups, each priority group comprising packets associated with substantially similar priority level indicia.

5. The method of claim 3, further comprising:
    indexing reordered packets according priority and sequence number; and
    iteratively performing the steps of swapping packet indices and reordering said packets to improve packet order.

6. The method of claim 2, wherein priority indicium associated with said retransmission packets comprises further comprises user preferences and technical parameters.

7. The method of claim 2, wherein the priority indicium is categorized as highest priority, higher priority, lower priority and lowest priority.

8. The method of claim 2, wherein priority indicia are determined using receiving device information and user preference information.

9. The method of claim 1, wherein one or more packets are discarded consistent with priority indicia of some of the packets.

10. The method of claim 1, further comprising:
    in response to receiving a new retransmission request prior to satisfying a previous retransmission request, combining without duplication retransmission request packets associated with the new retransmission request and remaining unsent packets associated with the previous retransmission request, and forwarding toward a device associated with a retransmission requests only retransmission packets able to be timely processed by said device as indicated by a time stamp included within said retransmission requests of a packet being processed by said device.

11. A system for improving error resilience in Internet Protocol Television (IPTV) communication, comprising:
    at least one retransmission (RET) server adapted to receive a multimedia stream for retransmission store a plurality of packets forming a most recent portion of the multimedia stream, and forward toward a device associated with a retransmission request only retransmission packets able to be timely processed by said device as indicated by a time stamp included within said retransmission request of a packet being processed by said device;
    wherein a time that a packet[k] may be forwarded to said device is expressed by the equation:

$$t[k]=t_{req}+u[k]-u_{out}-T_{RT}$$

where:
    $t_{req}$ is the time the RET server receives a request for retransmission;
    $u[k]-u_{out}$ is the latest a packet with a sequence number s[k] must arrive at the device after device transmission of the request;
    $T_{RT}$ is a round trip packet travel time between the device and RET server.

12. The system of claim 11, further comprising at least one receiving device, which receives the multimedia stream, reorders the packets according to said packets sequence number, detects gaps in the sequence numbers, requests retransmission from the RET server, receives retransmitted packets and processes received packets.

13. The system of claim 12, wherein the receiving device requests previously requested packets after a predetermined period of time.

* * * * *